(12) United States Patent
Liland

(10) Patent No.: US 8,485,344 B1
(45) Date of Patent: Jul. 16, 2013

(54) TORSIONAL TENSIONING DEVICE

(76) Inventor: David Kalor Liland, New Bern, NC (US)

( * ) Notice: Subject to any disclaimer, the term of this patent is extended or adjusted under 35 U.S.C. 154(b) by 0 days.

(21) Appl. No.: 13/352,441

(22) Filed: Jan. 18, 2012

(51) Int. Cl.
*B65G 45/16* (2006.01)

(52) U.S. Cl.
USPC .......................................... 198/499

(58) Field of Classification Search
USPC ............................... 198/497, 499
See application file for complete search history.

(56) References Cited

U.S. PATENT DOCUMENTS

| | | | |
|---|---|---|---|
| 4,533,036 A | 8/1985 | Gordon | |
| 5,201,402 A | 4/1993 | Mott | |
| 5,378,202 A * | 1/1995 | Swinderman | 198/499 |
| 5,992,614 A | 11/1999 | Mott | |
| 6,056,112 A | 5/2000 | Wiggins | |
| 6,152,290 A * | 11/2000 | Mott et al. | 198/499 |
| 6,315,105 B1 | 11/2001 | Gibbs | |
| 6,360,875 B1 | 3/2002 | Altemus | |
| 6,443,294 B1 | 9/2002 | Brody | |
| 6,612,419 B1 | 9/2003 | Watson | |
| 6,948,609 B2 | 9/2005 | Finger | |
| 7,083,040 B2 * | 8/2006 | Finger et al. | 198/499 |

* cited by examiner

*Primary Examiner* — James R Bidwell
(74) *Attorney, Agent, or Firm* — John F. Bohland

(57) ABSTRACT

A device for applying a torsional bias force to a shaft is provided. In a preferred embodiment the device is used in combination with a tube supporting a cleaning blade for a conveyor belt cleaner, thereby enabling the force of the cleaning blade against the conveyor belt to be precisely set to a desired value.

20 Claims, 5 Drawing Sheets

TORSIONAL TENSIONING DEVICE

BACKGROUND OF THE INVENTION

The present invention relates to devices for presetting torsional tension on a shaft or tube. More particularly, the present invention relates to devices for setting the torsional tension on a tube supporting a cleaning blade for a conveyor belt cleaner.

Conveyor belts are frequently used to carry materials such as coal and aggregates that leave residues on the belts. These residues are frequently removed using scraper blades. The scraper blades must contact the belt with sufficient force to remove the residues, but excessive force results in excessive wear on the blades. Even when the force is properly adjusted, normal wear causes the contact force to fall out of the optimum range, requiring readjustment. When the blade is rigidly mounted the required readjustment frequency is greater than desired.

Gordon, U.S. Pat. No. 4,533,036, teaches a torsion bias mechanism that provides effective continuing compensation for wear along the line of contact between the scraper blades and the surface of the belt. Adjustment of the torsional force is achieved using adjacent collars, each with a series of radial apertures, and U-shaped links joining the collars in the desired angular relationship.

Mott, U.S. Pat. No. 5,201,402, sought to improve the mechanism of Gordon by providing greater precision in the mechanism for selecting the blade force. According to Mott, practical design considerations limit the precision of the incremental adjustments in the prior art devices to approximately 11.25 degrees of rotation. Mott taught axial hole patterns in adjacent collars to achieve an adjustment precision as fine as 1.5 degrees. Although finer precision settings are achieved, Mott's mechanism still only allows discrete torsional load settings. Furthermore, Mott's mechanism appears to require two people to set the tension. One tool must be inserted in the adjustment collar and one tool must be inserted in the tensioning collar. The two tools must be used in combination to set the desired tension and align radial holes on the collars to receive a locking pin.

SUMMARY OF THE INVENTION

In one form the present invention is a torsional tensioning device that can be used to precisely set a desired torsional load on a shaft.

In another form the present invention is a conveyor belt cleaning device in which the cleaning blade force against the conveyor belt can be precisely controlled.

It is an object of the present invention to provide a torsional tensioning device that requires only one person to adjust the torsional load. One hand is used to set the desired tension and the other hand is used to lock in the desired tension.

It is a further object of the present invention to provide a torsional tensioning device on which the torsional force can be set using either a graduated tension guide cap or a torque wrench.

DETAILED DESCRIPTION OF PREFERRED EMBODIMENTS

Figure 1:
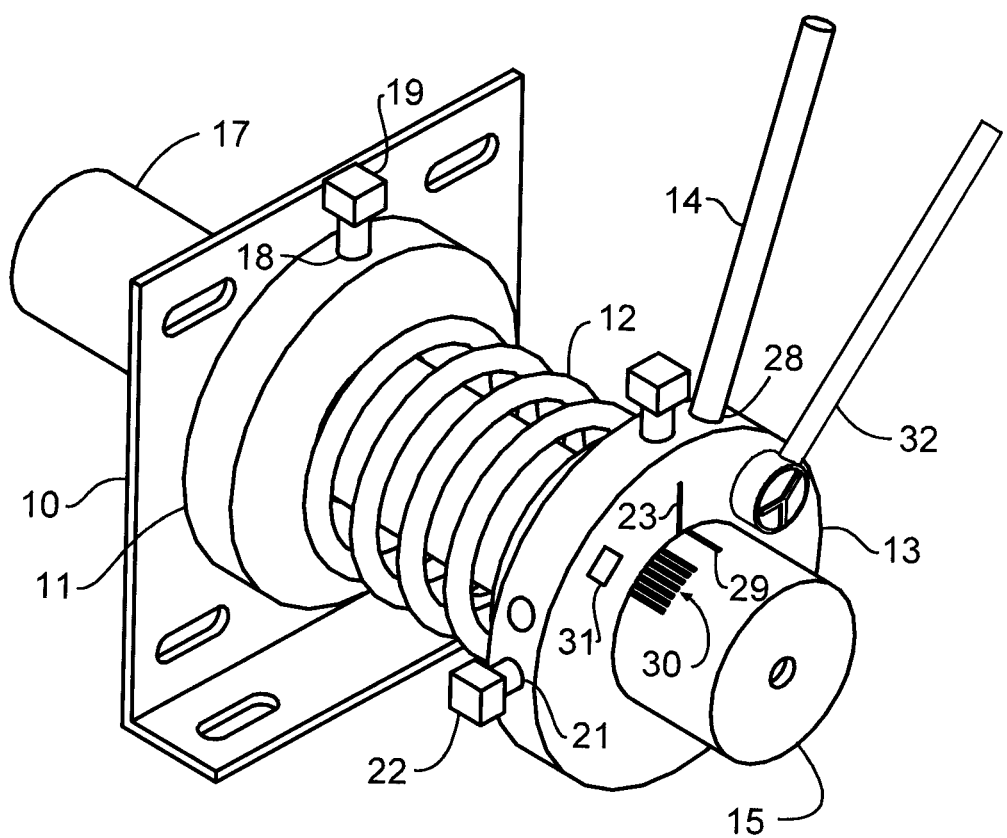
FIG. 1 is an isometric view of a torsional tensioning device according to the present invention.

FIG. 1 shows a torsional tensioning device according to the present invention. A mounting bracket 10 provides means for attaching the device to a machine or structure to apply a torsional load to a shaft. A bushing 11 is fixed to the mounting bracket. A torsional bias member, a helical spring 12 in this embodiment, is fixed to the bushing at one end and to a torsion ring 13 at the other end. A tensioning rod 14 and a tension guide cap 15 are also shown in FIG. 1.

The bracket is fabricated from steel, stainless steel, or other suitable material. It is shown as a universal mounting bracket in an "L" shape to provide different options for mounting in different applications. The universal mounting feature is optional; the mounting bracket may be custom fabricated for particular applications, and it may have different configurations. The only critical feature of the mounting bracket is that it provide mechanical support for the bushing.

A preferred bushing material is a composite molded directly to the bracket.

Figure 2:
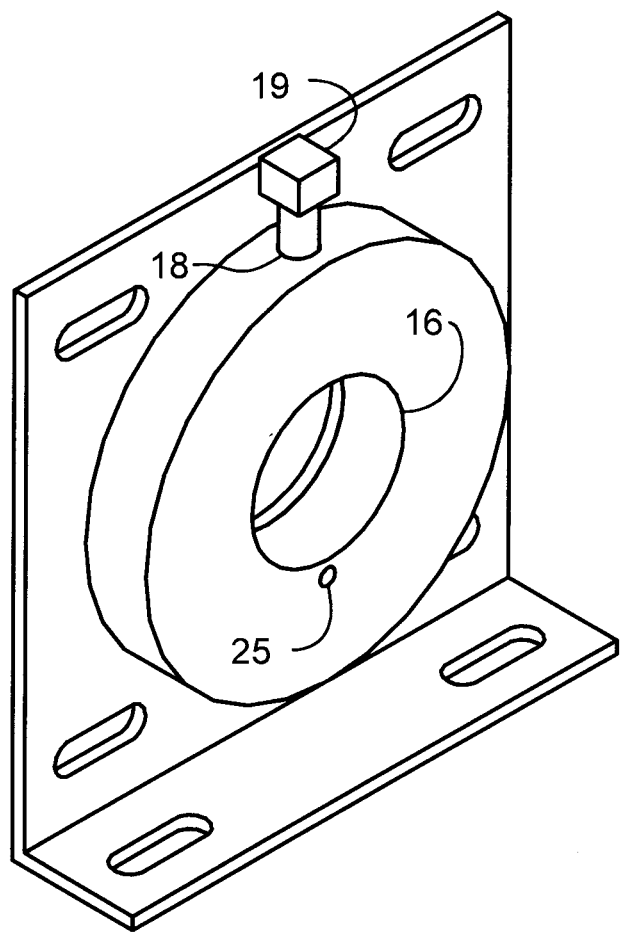
FIG. 2 is an isometric view of the mounting bracket and bushing of a torsional tensioning device according to the present invention.

FIG. 2 shows the mounting bracket with bushing separately to show an aperture 16 adapted to accommodate shaft 17. Note that the shaft is not shown because it is not a part of this embodiment of the invention. The term "adapted to accommodate" means, in this case, that the aperture is sufficiently small that it provides support for the shaft while being large enough that the shaft is free to turn in the bushing. The bushing further comprises means for temporarily locking the shaft relative to the bushing. In a preferred embodiment, the means for locking the shaft is a threaded aperture 18 and a threaded set screw 19, engaged with the threaded aperture.

Figure 3A:
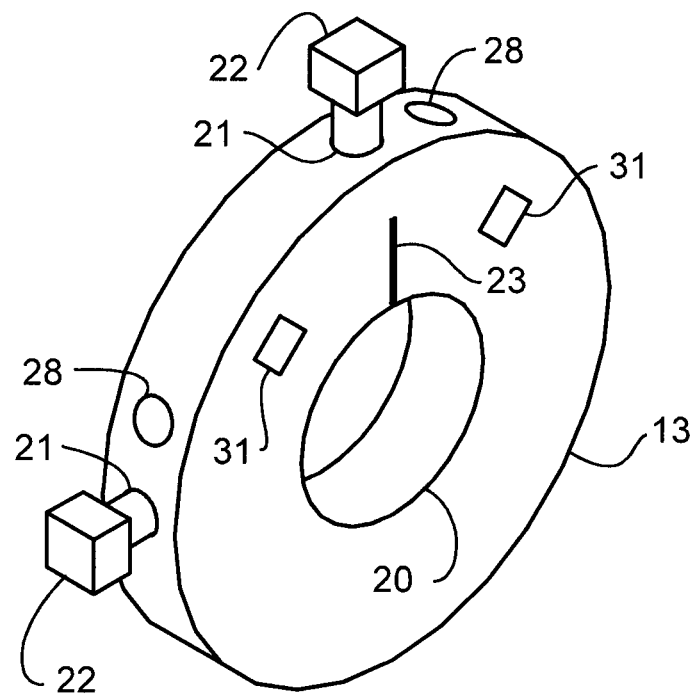
FIGS. 3a and 3b are isometric views from two sides of the torsion ring of a torsional tensioning device according to the present invention.
Figure 3B:
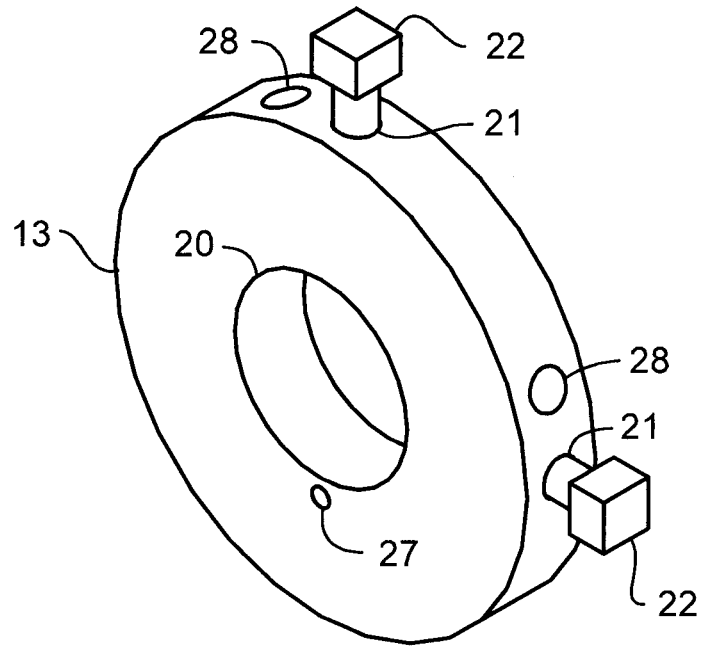

The torsion ring 13, shown in FIGS. 3a and 3b, comprises an aperture 20 adapted to accommodate the shaft and at least one radial threaded aperture 21, each with a threaded set screw 22. The set screws are used to fix the torsion ring to the shaft. An index mark 23 is used to align the guide cap 15 to the torsion ring 13.

Figure 4:
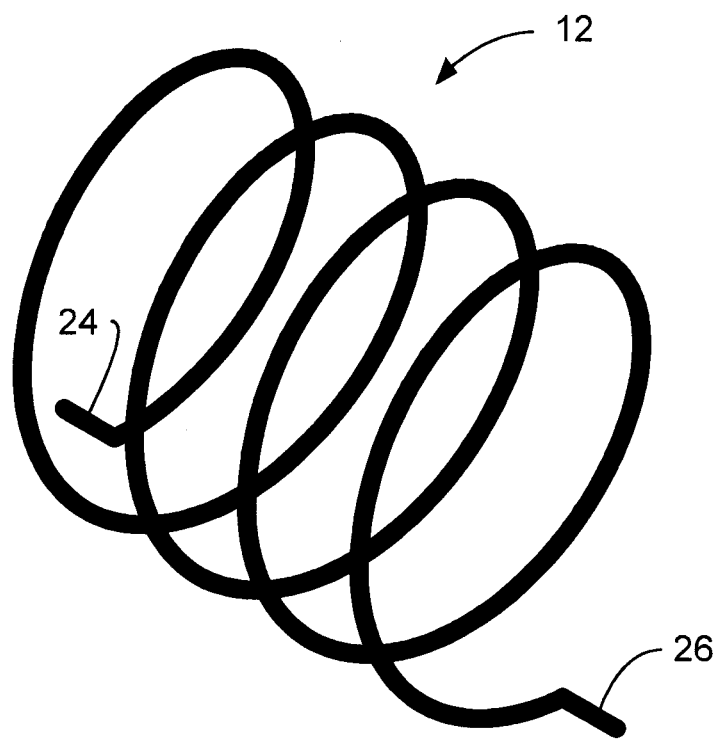
FIG. 4 is an isometric view of the spring of a torsional tensioning device according to the present invention.

In a preferred embodiment, the helical spring 12 provides a means for applying a torsional bias force. Other torsional bias members may be used, such as a compliant elastomer tube. The spring is shown separately in FIG. 4. In the assembly, the spring is attached at one end to the bushing and at the other end to the torsion ring. A first tab 24 on one end of the spring engages with an axial aperture 25 on the bushing, thereby fixing one end of the spring to the bushing, and a second tab 26 on the other end of the spring engages with an axial aperture 27 on the torsion ring (see FIG. 3b), thereby fixing the other end to the torsion ring. A preferred material for the helical spring is stainless steel.

The tensioning rod 14 fits into a radial aperture 28 on the torsion ring, providing leverage for loading the spring. The tensioning rod is used in conjunction with the tension guide cap 15 to set the desired torsional load on the shaft. The guide cap has an index mark 29 and a graduated scale 30, enabling precise and reproducible settings.

An axial aperture 31 in the torsion ring adapted to accommodate a torque wrench 32 is provided as an alternative to the tensioning rod with guide cap for loading the spring.

Figure 5:
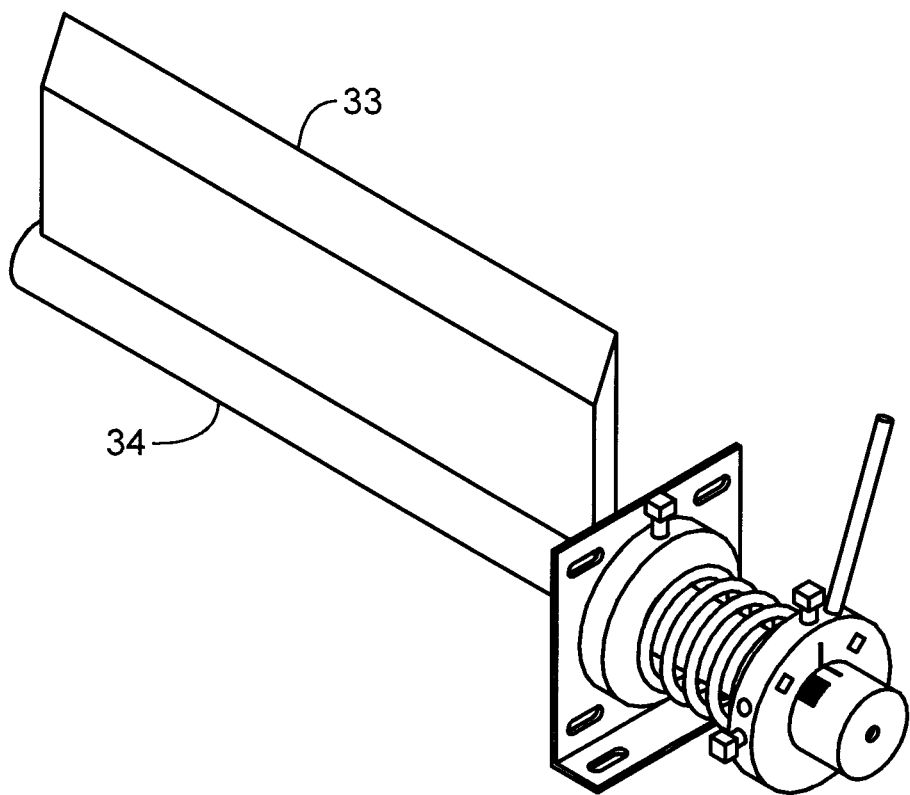
FIG. 5 is an isometric view of a conveyor belt cleaner according to the present invention.

The conveyor belt cleaner in FIG. 5 comprises a torsional tensioning device according to the present invention in combination with a belt cleaning blade 33 and a blade support tube 34 or shaft. Note that, as used in this specification, the word "shaft" includes a hollow tube.

A preferred method for setting the proper torsional load for a conveyor belt cleaning blade comprises the following steps:
1. loosen set screw 19 in the bushing 11 and set screws 22 in torsion ring 13.
2. rotate shaft until blade tip contacts the belt,
3. lock the blade in place using set screw 19 in bushing 11,
4. rotate the tension guide cap 15 until index mark 29 on the tension guide cap aligns with index mark 23 on the torsion ring.
5. insert tensioning rod 14 into radial aperture 28 on torsion ring 13 and rotate the torsion ring until index mark 23 on the torsion ring aligns with the desired mark on graduated scale 30 of tension guide cap 15.
6. tighten set screws 22 in torsion ring 13.
7. loosen set screw 19 in bushing 11.

An equally preferred alternative for setting the proper torsional load for a conveyor belt cleaning blade comprises the above steps with the following substitution for step 5.
5. insert a torque wrench 32 into axial aperture 31 on torsion ring 13 and rotate the torsion ring until the torque wrench indicates the desired loading.

The desired loading is a function of the properties of the materials and is determined prior to the machine setup.

What is claimed is:

1. A device for applying a torsional bias force to a shaft of a conveyor belt cleaner comprising:
   a mounting bracket,
   a bushing fixed to the mounting bracket, the bushing having a shaft aperture adapted to accommodate the shaft and means for temporarily locking the shaft relative to the bushing,
   a torsion ring having a shaft aperture adapted to accommodate the shaft and means for temporarily locking the torsion ring relative to the shaft,
   a torsional bias member fixed at one end to the bushing and fixed at the other end to the torsion ring,
   means for applying a torsional bias force to the torsional bias member.

2. The device of claim 1 wherein the means for temporarily locking the shaft relative to the bushing is a threaded radial aperture and a threaded set screw engaged in the threaded radial aperture.

3. The device of claim 1 wherein the torsional bias member having one end fixed to the bushing and the other end fixed to the torsion ring is a helical spring coaxial with the shaft.

4. The device of claim 1 wherein the means for temporarily locking the torsion ring relative to the shaft is at least one threaded radial aperture with a threaded set screw engaged in the threaded aperture.

5. The device of claim 1 wherein the means for applying a torsional bias force to the torsional bias member is a tension rod in combination with at least one radial aperture in the torsion ring adapted to accommodate the tension rod.

6. The device of claim 1 wherein the means for applying a torsional bias force to the torsional bias member comprises at least one axial aperture in the torsion ring adapted to accommodate a torque wrench.

7. The device of claim 1 further comprising a guide cap adapted to cover the end of the shaft, wherein the guide cap has graduated markings adapted to indicate torsional force, and wherein the torsion ring has an index mark adapted to align with graduated markings on the guide cap.

8. The device of claim 1 wherein:
   the means for temporarily locking the shaft relative to the bushing is a threaded radial aperture and a threaded set screw engaged in the threaded radial aperture,
   the means for temporarily locking the torsion ring relative to the shaft is at least one threaded radial aperture with a threaded set screw engaged in the threaded radial aperture, and
   the torsional bias member is a helical spring coaxial with the shaft and having one end fixed to the bushing and the other end fixed to the torsion ring.

9. The device of claim 8 wherein:
   the means for applying a torsional bias force to the torsional bias member is a tension rod in combination with at least one radial aperture in the torsion ring adapted to accommodate the tension rod, and further comprising:
   a guide cap adapted to cover the end of the shaft, wherein the guide cap has graduated markings adapted to indicate torsional force, and wherein the torsion ring has an index mark adapted to align with the graduated markings on the guide cap.

10. The device of claim 8 wherein the torsion ring comprises at least one axial aperture adapted to accommodate a torque wrench, thereby providing means for applying a torsional bias force to the torsional bias member.

11. A conveyor belt cleaner comprising:
    a shaft,
    a scraper blade attached to the shaft,
    the device of claim 1 for applying a torsional bias to the shaft.

12. A conveyor belt cleaner comprising:
    a shaft,
    a scraper blade attached to the shaft,
    the device of claim 2 for applying a torsional bias to the shaft.

13. A conveyor belt cleaner comprising:
    a shaft,
    a scraper blade attached to the shaft,
    the device of claim 3 for applying a torsional bias to the shaft.

14. A conveyor belt cleaner comprising:
    a shaft,
    a scraper blade attached to the shaft,
    the device of claim 4 for applying a torsional bias to the shaft.

15. A conveyor belt cleaner comprising:
    a shaft,
    a scraper blade attached to the shaft,
    the device of claim 5 for applying a torsional bias to the shaft.

16. A conveyor belt cleaner comprising:
    a shaft,
    a scraper blade attached to the shaft,
    the device of claim 6 for applying a torsional bias to the shaft.

17. A conveyor belt cleaner comprising:
    a shaft,
    a scraper blade attached to the shaft,
    the device of claim 7 for applying a torsional bias to the shaft.

18. A conveyor belt cleaner comprising:
    a shaft,
    a scraper blade attached to the shaft,
    the device of claim 8 for applying a torsional bias to the shaft.

19. A conveyor belt cleaner comprising:
    a shaft, a scraper blade attached to the shaft,
the device of claim 9 for applying a torsional bias to the shaft.

20. A conveyor belt cleaner comprising:
a shaft,
a scraper blade attached to the shaft,
the device of claim 10 for applying a torsional bias to the shaft.

* * * * *